United States Patent [19]
Cho et al.

[11] Patent Number: 5,838,875
[45] Date of Patent: Nov. 17, 1998

[54] APPARATUS AND METHOD FOR DISCRIMINATING BETWEEN ANALOG AND DIGITAL VIDEO SIGNALS IN HIGH DEFINITION VIDEO CASSETTE RECORDER

[75] Inventors: Dohyeon Cho, Seoul; Ho Won Lee, Kyungki-Do; Man Chul Choi, Seoul; Yong Hyu Shin, Kyungki-Do; Yoon Seok Seoh, Seoul; Soon Ki Lim, Seoul; Joong Kwon Joh, Seoul; Mun Chae Joung, Seoul; Young Jun Choi, Seoul; Kwan-Bo Shim, Seoul; Seungil Kim, Seoul, all of Rep. of Korea

[73] Assignee: Goldstar Co., Ltd., Seoul, Rep. of Korea

[21] Appl. No.: 703,838

[22] Filed: Aug. 27, 1996

Related U.S. Application Data

[63] Continuation of Ser. No. 191,187, Feb. 3, 1994, abandoned.

[30] Foreign Application Priority Data

| Feb. 5, 1993 | [KR] | Rep. of Korea | 1574/1993 |
| Feb. 5, 1993 | [KR] | Rep. of Korea | 1575/1993 |
| Feb. 19, 1993 | [KR] | Rep. of Korea | 2336/1993 |
| Mar. 9, 1993 | [KR] | Rep. of Korea | 3521/1993 |
| Mar. 29, 1993 | [KR] | Rep. of Korea | 5013/1993 |

[51] Int. Cl.⁶ .................................................. H04N 5/76
[52] U.S. Cl. ............................................ 386/123; 386/124
[58] Field of Search .............................. 386/46, 112, 124, 386/123, 95, 96, 105, 106; H04N 5/76

[56] References Cited

U.S. PATENT DOCUMENTS

| 4,583,132 | 4/1986 | Nakano et al. ......................... 358/341 |
| 4,609,949 | 9/1986 | Kutaragi ..................................... 360/27 |
| 4,937,680 | 6/1990 | Kawasaki ............................... 358/336 |
| 4,963,991 | 10/1990 | Honjo ..................................... 358/310 |
| 5,008,761 | 4/1991 | Nishiyama et al. ...................... 360/27 |
| 5,032,925 | 7/1991 | Ganse et al. ............................ 358/310 |
| 5,055,938 | 10/1991 | Misumi et al. ......................... 358/341 |
| 5,113,265 | 5/1992 | Kobayashi et al. ..................... 358/335 |
| 5,175,630 | 12/1992 | Tabuchi et al. ......................... 358/330 |
| 5,179,451 | 1/1993 | Takeshita et al. ...................... 358/335 |
| 5,251,075 | 10/1993 | Yoshida et al. ........................... 386/57 |
| 5,307,171 | 4/1994 | Azuma et al. .......................... 358/335 |
| 5,335,125 | 8/1994 | Nakatsu et al. ......................... 358/335 |

FOREIGN PATENT DOCUMENTS

| 0 488337 | 6/1992 | European Pat. Off. . |
| 60-209969 | 10/1985 | Japan . |
| 63-298865 | 5/1987 | Japan . |

OTHER PUBLICATIONS

Patent Abstracts of Japan, JP 63–298863; Jun. 12, 1988; vol. 13, No. 129.

Patent Abstracts of Japan, JP 3121685, May 23, 1991; vol. 15, No. 326.

*Primary Examiner*—Thai Tran
*Assistant Examiner*—Huy Nguyen

[57] ABSTRACT

An apparatus and a method for discriminating between analog and digital video signals in a high definition VCR are disclosed. The apparatus comprises a playback amplification circuit for amplifying a video signal recorded on a tape played back by a head when a playback mode is selected by the user, a signal detection circuit for detecting a signal from an output signal from the playback amplification circuit, the detected signal being indicative of whether the video signal recorded on the tape is analog or digital, a mode switching control circuit for discriminating in response to an output signal from the signal detection circuit whether the video signal recorded on the tape is analog or digital and outputting a mode switching control signal in accordance with the discriminated result, a switch being switched in response to the mode switching control signal from the mode switching control circuit, and analog and digital playback circuits for playback-processing the output signal from the playback amplification circuit under the control of the switch.

15 Claims, 6 Drawing Sheets

APPARATUS AND METHOD FOR DISCRIMINATING BETWEEN ANALOG AND DIGITAL VIDEO SIGNALS IN HIGH DEFINITION VIDEO CASSETTE RECORDER

This application is a continuation of application Ser. No. 08/191,187 filed on Feb. 3, 1994, now abandoned.

BACKGROUND OF THE INVENTION

1. Field of the Invention

The present invention relates in general to a high definition video cassette recorder (referred to hereinafter as VCR) which is capable of recording and playing back analog and digital video signals, and more particularly to an apparatus and a method for discriminating between the analog and digital video signals in the high definition VCR where it is discriminated whether a video signal recorded on a tape is analog or digital.

2. Description of the Background Art

Generally, a VCR is capable of recording and playing back only an analog video signal. Alternatively, a high definition VCR is capable of recording and playing back only a digital video signal or both the analog and digital video signals compatibly.

In the VCR which is capable of recording and playing back only the analog video signal, the analog video signal of about 5 MHz bandwidth is recorded on slant tracks of a tape at an azimuth angle of 6° in a recording mode, each of the slant tracks having a track pitch at a predetermined distance.

In the high definition VCR capable of recording and playing back only the digital video signal, the digital video signal of about 15 MHz bandwidth is recorded on slant tracks of a tape at an azimuth anele of 15° in a recording mode, each of the slant tracks having a track pitch at a predetermined distance.

In the case where any one of the tapes having the analog and digital video signals recorded thereon in different manners as mentioned above is inserted into the high definition VCR capable of recording and playing back both the analog and digital video signals, a faulty operation of the high definition VCR may take place because it is impossible to discriminate whether the video signal recorded on the tape is analog or digital. For example, provided that the tape on which the analog video signal is recorded is inserted into the high definition VCR and a playback mode corresponding to the digital video signal is selected under this condition, the high definition VCR recognizes the tape as a bad one although the tape is normal, because of the faulty operation. For this reason, the user must check the tapes one by one in selecting the playback mode. This results in inconvenience.

SUMMARY OF THE INVENTION

Therefore, the present invention has been made in view of the above problem, and it is an object of the present invention to provide an apparatus and a method for discriminating between analog and digital video signals in a high definition VCR in which it is discriminated whether a video signal recorded on a tape is analog or digital, according to an error correction capability for the digital video signal recorded on the tape or presence of a carrier frequency recorded on the tape, so that a faulty operation of the high definition VCR can be prevented.

It is another object of the present invention to provide an apparatus and a method for discriminating between analog and digital video signals in a high definition VCR in which an acknowledge signal indicative of the digital video signal is recorded on an audio track of a tape, whereby it is discriminated whether a video signal recorded on the tape is analog or digital, according to presence of the acknowledge signal, so that a faulty operation of the high definition VCR can be prevented.

It is yet another object of the present invention to provide an apparatus and a method for discriminating between analog and digital video signals in a high definition VCR in which it is discriminated whether a video signal recorded on the tape is analog or digital, according to a level when the video signal is played back, so that a faulty operation of the high definition VCR can be prevented.

In accordance with one aspect of the present invention, there is provided an apparatus for discriminating between analog and digital video signals in a high definition VCR, comprising playback amplification means for amplifying a video signal recorded on a tape played back by a head when a playback mode is selected by the user; signal detection means for detecting a signal from an output signal from said playback amplification means, the detected signal being indicative of whether the video signal recorded on the tape is analog or digital; mode switching control means for discriminating in response to an output signal from said signal detection means whether the video signal recorded on the tape is analog or digital and outputting a mode switching control signal in accordance with the discriminated result; switching means being switched in response to the mode switching control signal from said mode switching control means; and analog and digital playback means for playback-processing the output signal from said playback amplification means under the control of said switching means.

In accordance with another aspect of the present invention, there is provided a method of discriminating between analog and digital video signals in a high definition VCR, comprising the steps of (a) amplifying a video signal recorded on a tape played back by a head and detecting a signal indicative of whether the video signal recorded on the tape is analog or digital, from the amplified video signal; (b) discriminating in response to the signal detected at said step (a) whether the video signal recorded on the tape is analog or digital and outputting a mode switching control signal in accordance with the discriminated result; and (c) playback-processing the amplified video signal using a selected one of analog and digital playback circuits under the control of the mode switching control signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings which are given by way of illustration only, and thus are not limitative of the present invention, in which.

DETAILED DESCRIPTION OF THE PREFERRED EMBODIMENTS

Figure 1:
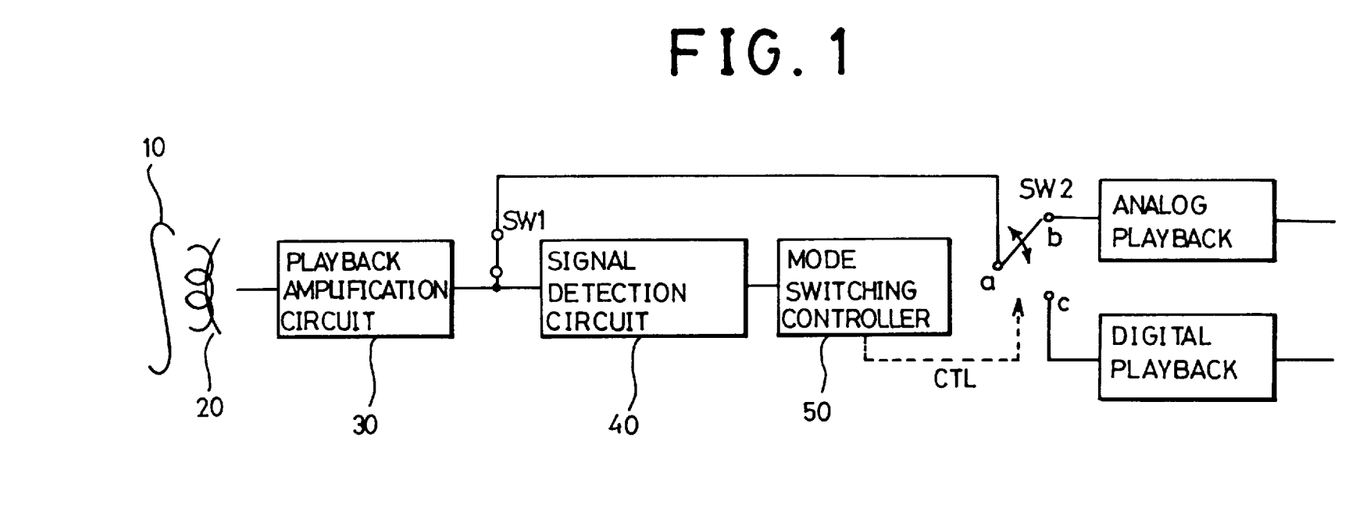
FIG. 1 is a block diagram of an example of an apparatus for discriminating between analog and digital video signals in a high definition VCR in accordance with the present invention.

Referring to FIG. 1, there is shown a block diagram of an example of an apparatus for discriminating between analog and digital video signals in a high definition VCR in accordance with an embodiment of the present invention. As shown in this drawing, the signal discrimination apparatus comprises a playback amplification circuit 30 for amplifying a video signal recorded on a tape 10 played back by a head 20 when a playback mode is selected by the user and a switch SW1 connected to an output of the playback amplification circuit 30. The switch SW1 is turned on or off for a predetermined time period in the playback mode.

A signal detection circuit 40 is provided in the signal discrimination apparatus to detect a signal from an output signal from the playback amplification circuit 30, transferred through the switch SW1. The detected signal is indicative of whether the video signal recorded on the tape is analog or digital.

A mode switching controller 50 is also provided in the signal discrimination apparatus to discriminate in response to an output signal from the signal detection circuit 40 whether the video signal recorded on the tape is analog or digital and output a mode switching control signal CTL in accordance with the discriminated result.

Also, the signal discrimination apparatus comprises a switch SW2 being switched in response to the mode switching control signal CTL from the mode switching controller 50, and analog and digital playback circuits 60 and 70 for playback-processing the output signal from the playback amplification circuit 30 under the control of the switch SW2.

The operation of the signal discrimination apparatus with the above-mentioned construction in accordance with the present invention will hereinafter be described in detail.

In the playback mode, the video signal recorded on the tape 10 is played back by the head 20 and then amplified by a predetermined level by the playback amplification circuit 30. The output signal from the playback amplification circuit 30 is applied to the signal detection circuit 40 through the switch SW1. Then, the signal indicative of whether the video signal recorded on the tape is analog or digital is detected from the output signal from the playback amplification circuit 30 by the signal detection circuit 40 and then applied to the mode switching controller 50. In response to the output signal from the signal detection circuit 40, the mode switching controller 50 outputs the mode switching control signal CTL.

The switch SW2 is switched in response to the mode switching control signal CTL from the mode switching controller 50. In the case where a contact a of the switch SW2 is connected to a contact b thereof in response to the mode switching control signal CTL from the mode switching controller 50, the output signal from the playback amplification circuit 30 is applied to the analog playback circuit 60 because the video signal recorded on the tape 10 is analog. On the contrary, in the case where the contact a of the switch SW2 is connected to a contact c thereof in response to the mode switching control signal CTL from the mode switching controller 50, the output signal from the playback amplification circuit 30 is applied to the digital playback circuit 70 because the video signal recorded on the tape 10 is digital.

Figure 2:
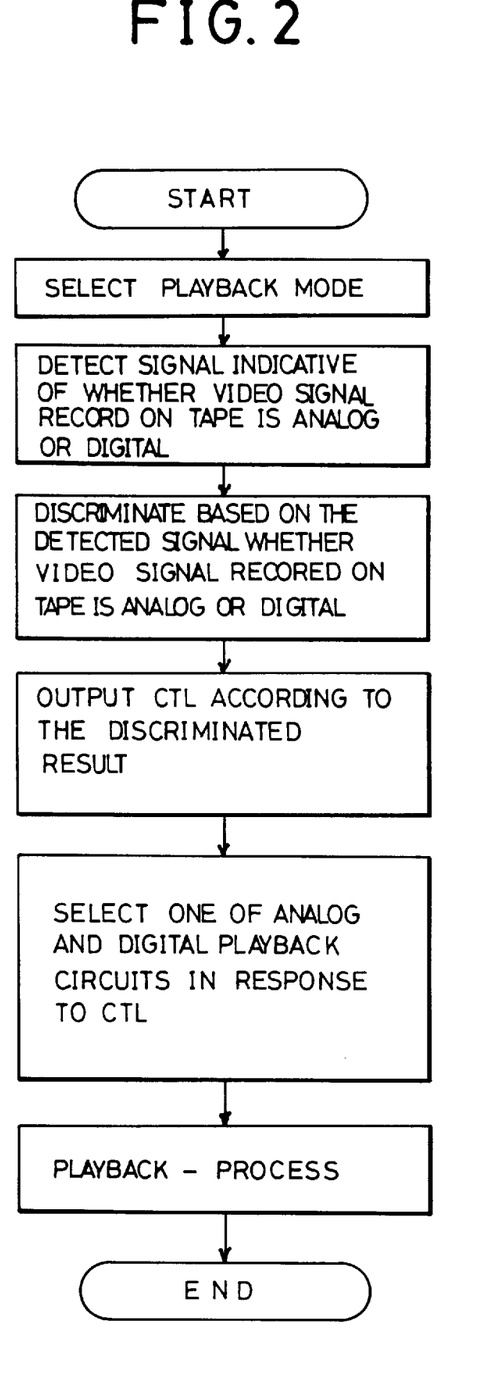
FIG. 2 is a flowchart illustrating a method of discriminating between the analog and digital video signals in the high definition VCR in accordance with the present invention.

The above-mentioned operation of the signal discrimination apparatus will hereinafter be described in more detail with reference to FIG. 2, which is a flowchart illustrating a method of discriminating between the analog and digital video signals in the high definition VCR in accordance with an embodiment of the present invention.

In the playback mode, the video signal recorded on the tape 10 is played back by the head 20 and then amplified by the playback amplification circuit 30. Then, the signal indicative of whether the video signal recorded on the tape is analog or digital is detected from the amplified video signal. Based on this detected signal it is discriminated whether the video signal recorded on the tape is analog or digital. If it is discriminated that the video signal recorded on the tape is analog, the mode switching control signal is at low level. On the contrary, if it is discriminated that the video signal recorded on the tape is digital, the mode switching control signal is at high level. Then, the amplified video signal is playback-processed by the analog or digital playback circuit selected by the mode switching control signal.

Figure 3:
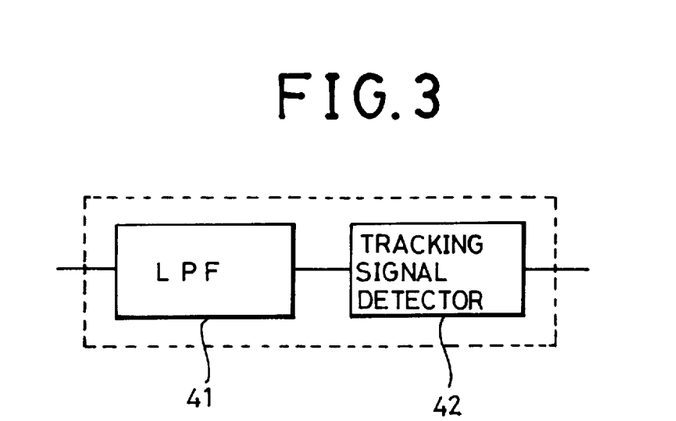
FIG. 3 is a detailed block diagram of an example of a signal detection circuit in FIG. 1 in accordance with a first embodiment of the present invention.

Referring to FIG. 3, there is shown a detailed block diagram of the signal detection circuit 40 in accordance with a first embodiment of the present invention. As shown in this drawing, the signal detection circuit 40 includes a low pass filter (LPF) 41 for low pass filtering the output signal from the playback amplification circuit 30, and a tracking signal detector 42 for detecting a tracking signal from an output signal from the low pass filter 41. Here, the tape 10, the head 20, the playback amplification circuit 30, and the analog and digital playback circuits 60 and 70, which are the same as those shown in FIG. 1 can be used with circuit 40, for example.

In operation, the video signal amplified by the playback amplification circuit 30 is applied to the low pass filter 41, which passes a signal recorded on the lower portion of a video track of the tape 10 to the tracking signal detector 42. The tracking signal detector 42 detects the tracking signal from the output signal from the low pass filter 41 and outputs the detected tracking signal to the mode switching controller 50.

Upon receiving the tracking signal from the tracking signal detector 42 in the signal detection circuit 40, the mode switching controller 50 determines that the video signal recorded on the tape 10 is digital and thus outputs the mode switching control signal CTL of high level. On the other hand, upon receiving no tracking signal from the tracking signal detector 42 in the signal detection circuit 40, the mode switching controller 50 determines that the video signal recorded on the tape 10 is analog and thus outputs the mode switching control signal CTL of the low level.

When the mode switching control signal CTL from the mode switching controller 50 is at high level, the contact a of the switch SW2 is connected to the contact c thereof, thereby causing the output signal from the playback amplification circuit 30 to be applied to the digital playback circuit 70 and playback-processed thereby. On the contrary, if the mode switching control signal CTL from the mode switching controller 50 is at low level, the contact a of the switch SW2 is connected to the contact b thereof. As a result, the output signal from the playback amplification circuit 30 is applied to the analog playback circuit 60 and playback-processed thereby.

Figure 4:
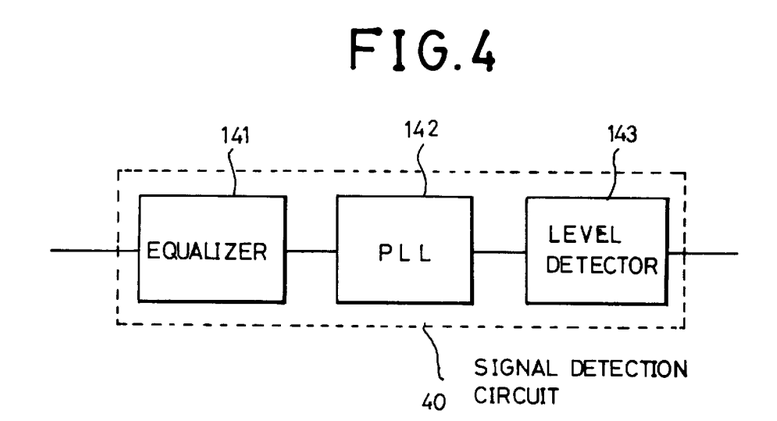
FIG. 4 is a detailed block diagram of the signal detection circuit in FIG. 1 in accordance with a second embodiment of the present invention.

Referring to FIG. 4, there is shown a detailed block diagram of the signal detection circuit 40 in accordance with a second embodiment of the present invention. As shown in this drawing, the signal detection circuit 40 includes an equalizer 141 for compensating for a distortion of the output signal from the playback amplification circuit 30 according to a filter coefficient suitable to characteristics of the tape and a channel, a phase locked loop (PLL) 142 for comparing a phase of an output signal from the equalizer 141 with that of a reference signal and outputting a phase difference in accordance with the compared result, and a level detector 143 for detecting a level of the video signal recorded on the tape 10 in response to an output signal from the phase locked loop 142. In this embodiment, the mode switching controller 50 is adapted to compare an output level from the level detector 143 in the signal detection circuit 40 with a reference level. If the output level from the level detector 143 is greater than the reference level in accordance with the compared result, it is discriminated that the video signal recorded on the tape 10 is digital. In this case, the mode switching controller 50 outputs the mode switching control signal CTL of the high level. On the contrary, if the output level from the level detector 143 is smaller than the reference level in accordance with the compared result, the mode switching controller 50 determines that the video signal recorded on the tape 10 is analog and thus outputs the mode switching control signal CTL of low level. Here, the tape 10, the head 20, the playback amplification circuit 30, the switches SW1 and SW2, and the analog and digital playback circuits 60 and 70, which are the same as those shown in FIG. 1 can be used with the circuit 40, for example.

In operation, the video signal recorded on the tape 10 is played back by the head 20 and then amplified by the playback amplification circuit 30. The output signal from the playback amplification circuit 30 is applied to the signal detection circuit 40.

In the signal detection circuit 40, the distortion of the output signal from the playback amplification circuit 30 is compensated by the equalizer 141 and the resultant signal is applied to the phase locked loop 142. The phase of output signal from the equalizer 141 is compared with the phase of the reference signal by the phase locked loop 142, which then outputs the phase difference as a result of the comparison. Then, the level detector 143 detects the level of the video signal recorded on the tape 10 in response to the output signal from the phase locked loop 142.

The output level from the level detector 143 in the signal detection circuit 40 is applied to the mode switching controller 50. If the video signal recorded on the tape 10 is digital, the output level from the level detector 143 is greater than the reference level. In this case, the mode switching controller 50 outputs the mode switching control signal CTL of high level. On the contrary, the output level from the level detector 143 is smaller than the reference level when the video signal recorded on the tape 10 is analog. As a result, the mode switching controller 50 outputs the mode switching control signal CTL of the low level.

The switch SW2 is controlled by the mode switching control signal CTL which is outputted from the mode switching controller 50 in the above-mentioned manner. Then, the output signal from the playback amplification circuit 30 is playback-processed by the analog or digital playback circuit 60 or 70 under the control of the switch SW2.

Figure 5:
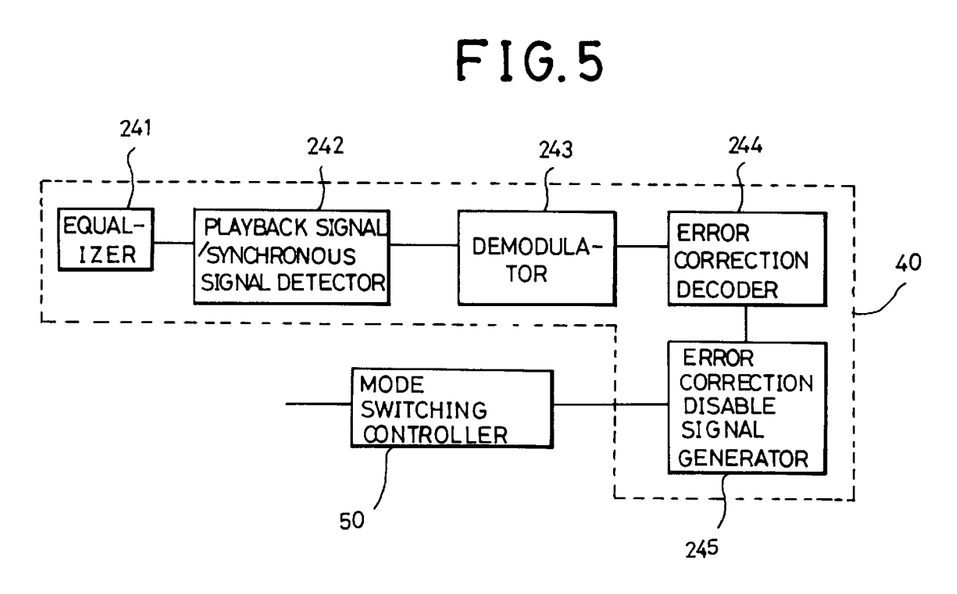
FIG. 5 is a detailed block diagram of the signal detection circuit in FIG. 1 in accordance with a third embodiment of the present invention.

Referring to FIG. 5, there is shown a detailed block diagram of the signal detection circuit 40 in accordance with a third embodiment of the present invention. As shown in this drawing, the signal detection circuit 40 includes an equalizer 241 for compensating for a distortion of the output signal from the playback amplification circuit 30, a playback signal/synchronous signal detector 242 for wave-shaping an output signal from the equalizer 241 and detecting a synchronous signal from the wave-shaped signal, a demodulator 243 for demodulating an output signal from the playback signal/synchronous signal detector 242 at a frequency suitable to a channel characteristic, an error correction decoder 244 for extracting and correcting errors of an output signal from the demodulator 243, and an error correction disable signal generator 245 for generating an error correction disable signal when the video signal recorded on the tape 10 is analog or when the number of the errors of the output signal from the demodulator 243 is out of an error correction capability of the error correction decoder 244. Here, the tape 10, the head 20, the playback amplification circuit 30, and the analog and digital playback circuits 60 and 70, which are the same as those shown in FIG. 1, can be used with the circuit 40, for example. Also, the signal detection circuit 40 may share the equalizer 241, the playback signal/synchronous signal detector 242, the demodulator 243 and the error correction decoder 244 with the digital playback circuit 70.

In operation, the video signal recorded on the tape 10 is played back by the head 20 and then amplified by the playback amplification circuit 30. The output signal from the playback amplification circuit 30 is applied to the signal detection circuit 40.

In the signal detection circuit 40, the distortion of the output signal from the playback amplification circuit 30 is compensated for by the equalizer 241 and the resultant signal is applied to the playback signal/synchronous signal detector 242. The playback signal/synchronous signal detector 242 wave-shapes the output signal from the equalizer 241 and detects the synchronous signal from the wave-shaped signal.

The output signal from the playback signal/synchronous signal detector 242 is demodulated by the demodulator 243 at the frequency suitable to the channel characteristic or a recording/playback characteristic of the high definition VCR. Then, the error correction decoder 244 extracts and corrects the errors of the output signal from the demodulator 243, which are the ones generated in the recording/playback operations of the video signal.

The error correction disable signal generator 245 generates the error correction disable signal when the video signal recorded on the tape 10 is analog or when the number of the errors of the output signal from the demodulator 243 is out of the error correction capability of the error correction decoder 244. Namely, the error correction disable signal from the error correction disable signal generator 245 is at high level when the video signal recorded on the tape 10 is analog. In this case, the mode switching controller 50 outputs the mode switching control signal CTL of low level in response to the error correction disable signal of high level. On the contrary, the error correction disable signal from the error correction disable signal generator 245 is at low level when the video signal recorded on the tape 10 is digital. As a result, the mode switching controller 50 outputs the mode switching control signal CTL of the high level in response to the error correction disable signal of low level.

Then, the output signal from the playback amplification circuit 30 is playback-processed by the analog or digital playback circuit 60 or 70 selected by the switch SW2 under the control of the mode switching control signal CTL.

Figure 6:
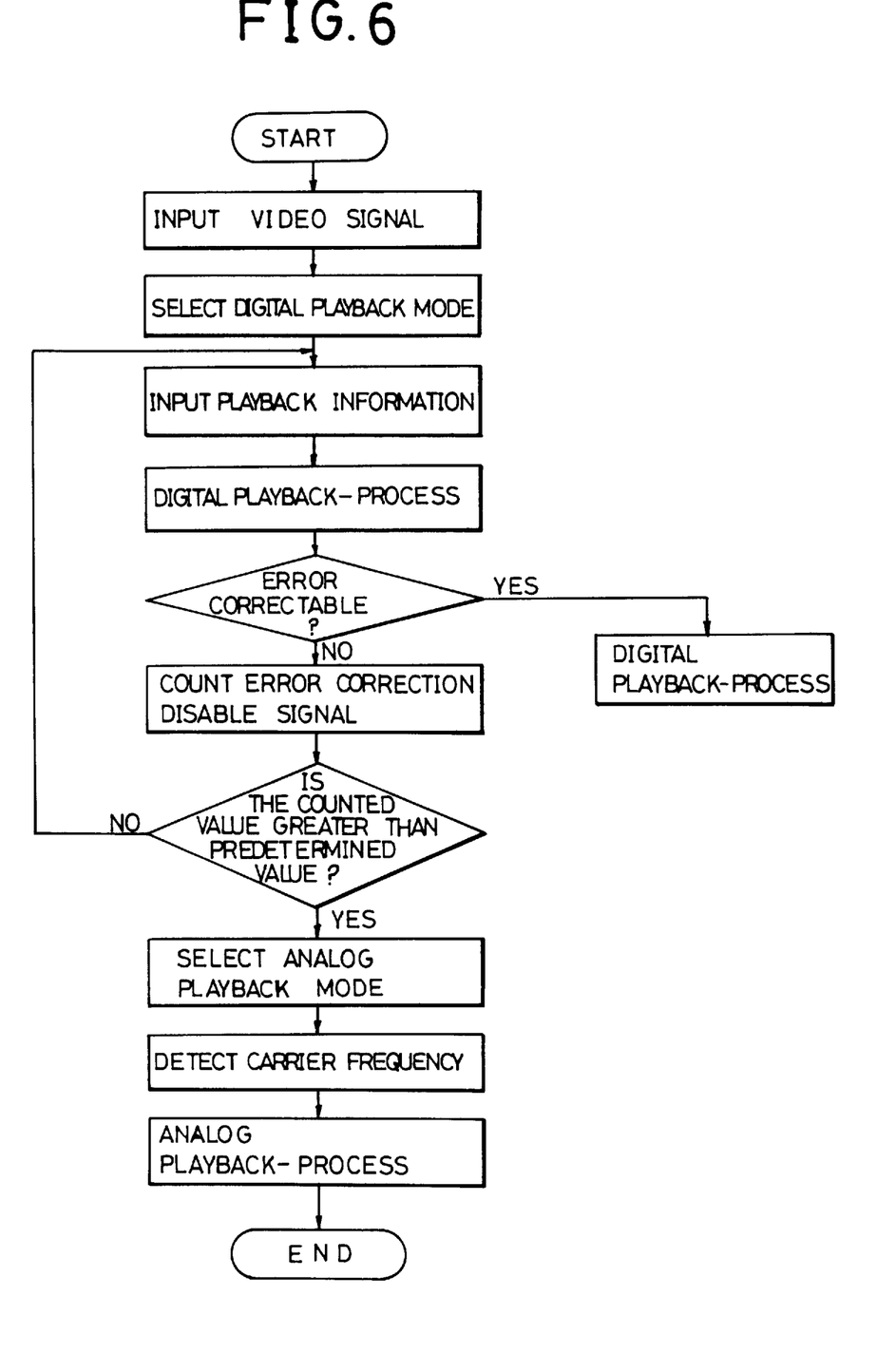
FIG. 6 is a flowchart illustrating a method of discriminating between the analog and digital video signals in the high definition VCR in accordance with the third embodiment of the present invention.

The above-mentioned operation of the signal discrimination apparatus in accordance with the third embodiment of the present invention will hereinafter be described in more detail with reference to FIG. 6, which is a flowchart illustrating a method of discriminating between the analog and digital video signals in the high definition VCR in accordance with the third embodiment of the present invention. Here, it is assumed that the signal detection circuit 40 shares the equalizer 241, the playback signal/synchronous signal detector 242, the demodulator 243 and the error correction decoder 244 with the digital playback circuit 70.

In the case where the playback mode is selected by the user, the output signal from the playback amplification circuit 30 is applied to the error correction decoder 244 in the digital playback circuit 70 through the contacts a and c of the switch SW2 and the equalizer 241, the playback signal/synchronous signal detector 242 and the demodulator 243 in the digital playback circuit 70.

It is then checked whether or not the number of the errors of the output signal from the demodulator 243 is out of the error correction capability of the error correction decoder 244. If it is checked that the number of the errors of the output signal from the demodulator 243 is within the error correction capability of the error correction decoder 244, it is determined that the video signal recorded on the tape 10 is digital. As a result, the output signal from the playback amplification circuit 30 is playback-processed by the digital playback circuit 70.

On the contrary, if it is checked that the number of the errors of the output signal from the demodulator 243 is out of the error correction capability of the error correction decoder 244, the error correction disable signal of high level is outputted from the error correction disable signal generator 245 because the video signal recorded on the tape 10 is analog. In this case, the mode switching controller 50 outputs the mode switching control signal CTL of low level in response to the error correction disable signal of high level, thereby causing the contact a of the switch SW2 to be connected to the contact b thereof. As a result, the output signal from the playback amplification circuit 30 is playback-processed by the analog playback circuit 60.

Figure 7:
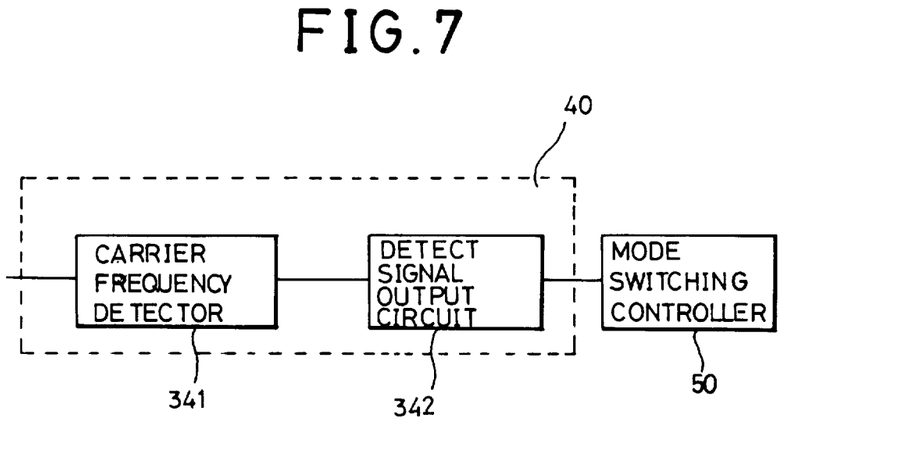
FIG. 7 is a detailed block diagram of the signal detection circuit in FIG. 1 in accordance with a fourth embodiment of the present invention.

Referring to FIG. 7, there is shown a detailed block diagram of the signal detection circuit 40 in accordance with a fourth embodiment of the present invention. As shown in this drawing, the signal detection circuit 40 includes a carrier frequency detector 341 for detecting a carrier frequency from the output signal from the playback amplification circuit 30, and a detection signal output circuit 342 for outputting a detection signal to the mode switching controller 50 in response to an output signal from the carrier frequency detector 341. The detection signal from the detect signal output circuit 342 is at high level when the carrier frequency is detected by the carrier frequency detector 341, whereas the detection signal is at low level when the carrier frequency is not detected by the carrier frequency detector 341. Here, the tape 10, the head 20, the playback amplification circuit 30, the mode switching controller 50, and the analog and digital playback circuit 60 and 70, which are the same as those shown in FIG. 4, can be used with the circuit 40, for example. Also, the signal detection circuit 40 may share the carrier frequency detector 341 with the analog playback circuit 60.

In operation, the video signal amplified by the playback amplification circuit 30 is applied to the carrier frequency detector 341 in the signal detection circuit 40, which detects the carrier frequency from the received signal. Then in the signal detection circuit 40, the detection signal output circuit 342 checks for the presence of the carrier frequency in response to the output signal from the carrier frequency detector 341.

Namely, the detection signal output circuit 342 outputs the detection signal of high level when the carrier frequency is detected by the carrier frequency detector 341, whereas the detection signal of low level is output when the carrier frequency is not detected by the carrier frequency detector 341. The detection signal from the detection signal output circuit 342 is applied to the mode switching controller 50.

Upon receiving the high level detection signal from the detect signal output circuit 342, the mode switching controller 50 outputs the mode switching control signal CTL of low level, thereby causing the contact a of the switch SW2 to be connected to the contact b thereof. As a result, the output signal from the playback amplification circuit 30 is playback-processed by the analog playback circuit 60.

On the contrary, upon receiving the low level detection signal from the detection signal output circuit 342, the mode switching controller 50 outputs the mode switching control signal CTL of high level. In this case, the contact a of the switch SW2 is connected to the contact c thereof in response to the mode switching control signal CTL of high level. As a result, the output signal from the playback amplification circuit 30 is playback-processed by the digital playback circuit 70.

Figure 9:
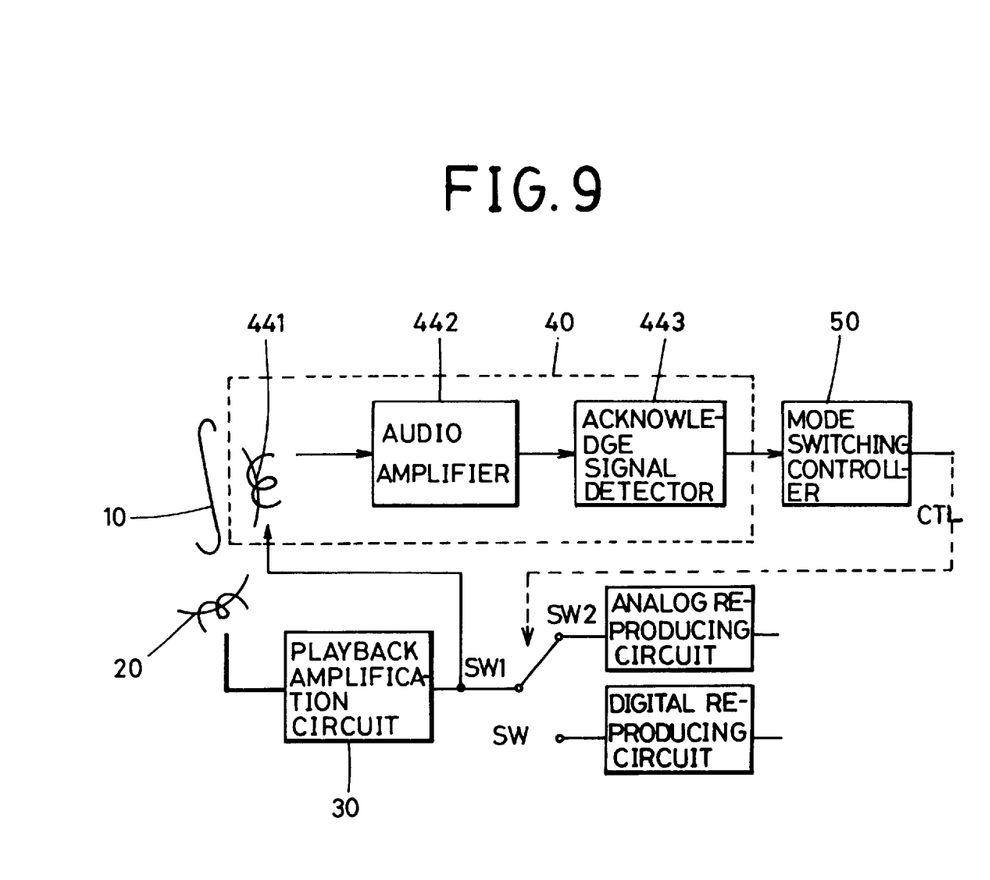
FIG. 9 is a detailed block diagram of the signal detection circuit in FIG. 1 in accordance with a fifth embodiment of the present invention.

Referring to FIG. 9, there is shown a detailed block diagram of the signal detection circuit 40 in accordance with a fifth embodiment of the present invention. As shown in this drawing, the signal detection circuit 40 includes an audio amplifier 442 for amplifying an audio signal played back by an audio head 441 by a predetermined level, and an acknowledge signal detector 443 for detecting an acknowledge signal in response to an output signal from the audio amplifier 442. The acknowledge signal indicates that the video signal recorded on the tape 10 is digital. As will be mentioned later, the output signal from the audio amplifier 442 is the acknowledge signal when the video signal recorded on the tape 10 is digital. Upon detection of the acknowledge signal by the signal detection circuit 40, the mode switching controller 50 determines that the video signal recorded on the tape 10 is digital and thus outputs the mode switching control signal CTL of high level.

Figure 8:
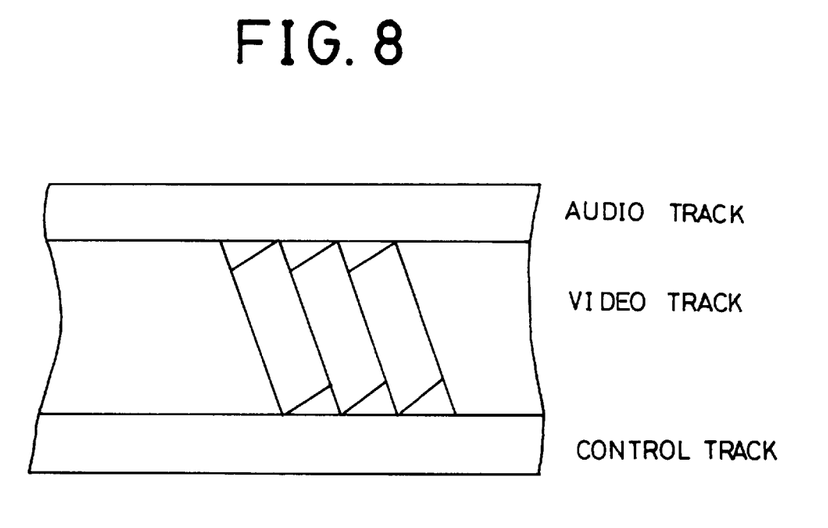
FIG. 8 is a view illustrating a recording pattern of a tape which is applied to the present invention.

FIG. 8 is a view illustrating a recording pattern of the tape 10 which is applied to the present invention. In a recording mode, the analog video signal is recorded on the video track of the tape 10 by the head 20 and the analog audio signal is recorded on the audio track of the tape 10 by the audio head 441. On the other hand, the digital video signal is recorded on the video track of the tape 10 together with a digital audio signal. In this case, there is no audio signal recorded on the audio track of the tape 10 on which the analog audio signal can be recorded. In this connection, the acknowledge signal indicating that the video signal recorded on the tape 10 is digital is recorded on the audio track of the tape 10 in the recording of the digital video signal.

In the playback mode, the audio signal recorded on the audio track of the tape 10 is played back by the audio head 441 and then amplified by the audio amplifier 442. Then, the acknowledge signal detector 443 checks whether or not the output signal from the audio amplifier 442 is the acknowledge signal.

Upon detection of the acknowledge signal by the signal detection circuit 40, the mode switching controller 50 determines that the video signal recorded on the tape 10 is digital and thus outputs the mode switching control signal CTL of high level. On the contrary, upon detection of no acknowledge signal by the signal detection circuit 40, the mode switching controller 50 determines that the video signal recorded on the tape 10 is analog and thus outputs the mode switching control signal CTL of low level.

In the case where the mode switching control signal CTL of low level is outputted from the mode switching controller 50, the contact a of the switch SW2 is connected to the contact b thereof. As a result, the output signal from the playback amplification circuit 30 is playback-processed by the analog playback circuit 60.

On the contrary, when the mode switching control signal CTL of high level is outputted from the mode switching controller 50, the contact a of the switch SW2 is connected to the contact c thereof, thereby causing the output signal from the playback amplification circuit 30 to be playback-processed by the digital playback circuit 70.

As apparent from the above description, according to the present invention, it is discriminated whether the video signal recorded on the tape is analog or digital by detecting the acknowledge signal recorded on the tape and one of the analog and digital playback circuits is selected in accordance with the discriminated result. Therefore, a faulty operation of the high definition VCR can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In an analog/digital videocassette recorder, an apparatus for discriminating whether a video signal reproduced from a video tape during a playback mode is an analog video signal or a digital video signal, the apparatus comprising:

playback amplification means for amplifying a video signal recorded on a video track of a video tape;

analog playback means for processing an analog video signal;

digital playback means for processing a digital video signal;

audio head means for reproducing a signal recorded on an audio track of the video tape during a playback mode;

audio amplifier means for amplifying the signal reproduced by the audio head means;

acknowledge signal detector means, operably connected with the audio amplifier means, for detecting presence of an acknowledge signal based on the signal reproduced from the audio track of the video tape, said acknowledge signal being recorded on the audio track of the videotape during a recording of a digital video signal on the video track of the video tape;

mode switching control means, operably connected with the acknowledge signal detector means, for determining that the video signal recorded on the video tape is a digital video signal when the acknowledge signal is detected by the acknowledge signal detector means and that the video signal recorded on the video tape is an analog video signal when no acknowledge signal is detected by the acknowledge signal detector means, and for outputting a mode switching control signal in accordance with the determination; and mode switching means for selectively connecting the playback amplification means with one of the analog playback means and the digital playback means in response to the mode switching control signal so as to process the amplified video signal from the playback amplification means.

2. An apparatus of claim 1, wherein the mode switching means connects the playback amplification means with the analog playback means when no acknowledge signal is detected by the acknowledge signal detector means, and connects the playback amplification means with the digital playback means when the acknowledge signal is detected by the acknowledge signal detector means.

3. An apparatus of claim 1, wherein the playback amplification means includes a playback amplification circuit, the analog playback means includes an analog reproducing circuit, and the digital playback means includes a digital reproducing circuit.

4. An apparatus of claim 3, wherein the audio head means includes an audio head and the audio amplifier means includes an audio amplifier circuit.

5. An apparatus of claim 4, wherein the acknowledge signal detector means includes a detection circuit for detecting the presence of an acknowledge signal, the mode switch control means includes a controller for generating the mode switching control signal, and the mode switching means includes a switch for selecting one of the analog reproducing circuit and the digital reproducing circuit.

6. In an analog/digital videocassette recorder including a playback amplification circuit for amplifying a video signal reproduced from a video tape by a video playback head, an analog playback circuit for processing a reproduced analog video signal, a digital playback circuit for processing a reproduced digital video signal, an audio head for reproducing a recorded signal from an audio track of a video tape, and an audio amplifier for amplifying the signal reproduced by the audio head, a method for discriminating whether a video signal reproduced from a video tape in a playback mode is an analog video signal or a digital video signal, the method comprising the steps of:

detecting presence of an acknowledge signal from a signal recorded on an audio track of a video tape during a playback mode, the acknowledge signal being recorded on the audio track of the video tape during a recording of a digital video signal onto a video track of the video tape;

determining that a video signal recorded on the video track of the video tape is a digital video signal when the acknowledge signal is detected and that the video signal recorded on the video track of the video tape is an analog video signal when no acknowledge signal is detected;

generating a mode switching control signal in accordance with the determination; and selectively connecting the playback amplification circuit with one of the analog playback circuit and the digital playback circuit in response to the mode switching control signal so as to process the video signal recorded on the video tape.

7. A method of claim 6, wherein said selectively connecting step includes the steps of:

connecting the playback amplification circuit with the analog playback circuit when no acknowledge signal is detected, and connecting the playback amplification circuit with the digital playback circuit when the acknowledge signal is detected.

8. A method of claim 7, wherein said detecting step includes the step of reproducing the signal recorded on the audio track of the video tape using the audio head.

9. In an analog/digital videocassette recorder including a playback amplification circuit for amplifying a video signal recorded on video tracks of a video tape, an analog reproducing circuit for processing an analog video signal, and a digital reproducing circuit for processing a digital video signal, an apparatus for discriminating whether a video signal reproduced from a video tape is an analog video signal or a digital video signal, the apparatus comprising:

audio means for reproducing a signal recorded on an audio track of a video tape, acknowledge signal detector means for detecting whether the signal reproduced by the audio means is an acknowledge signal indicating that a digital signal is recorded on corresponding video tracks of the video tape, and mode control means for connecting the playback amplification circuit with the digital reproducing circuit when the acknowledge signal is detected by the acknowledge signal detector means, and connecting the playback amplification circuit with the analog playback circuit when no acknowledge signal is detected by the acknowledge signal detector means.

10. An apparatus of claim 9, wherein the mode control means generates a control signal in accordance with the detection by the acknowledge signal detector means, and includes a switch for connecting the playback amplification circuit with one of the analog reproducing circuit and the digital reproducing circuit according to the control signal.

11. An apparatus of claim 10, wherein the audio means includes an audio head for reading the signal recorded on the audio track of the video tape, and an audio amplifier for amplifying the signal read by the audio head.

12. An apparatus of claim 11, wherein the acknowledge signal is recorded on the tape during a recording of a digital video signal on the tape.

13. An apparatus of claim 12, wherein the audio means reproduces the signal recorded on the audio track of the video tape during a playback mode.

14. An apparatus of claim 13, wherein the acknowledge signal detector means includes a detecting circuit for detecting the presence of the acknowledge signal from the signal reproduced by the audio means.

15. An apparatus of claim 14, wherein the analog/digital video cassette recorder further includes a video head for recording and reproducing a video signal on and from the video tracks of the video tape.

* * * * *